No. 711,813. Patented Oct. 21, 1902.
C. E. & G. M. AUSTIN.
BAKE PAN.
(Application filed Mar. 20, 1902.)
(No Model.)
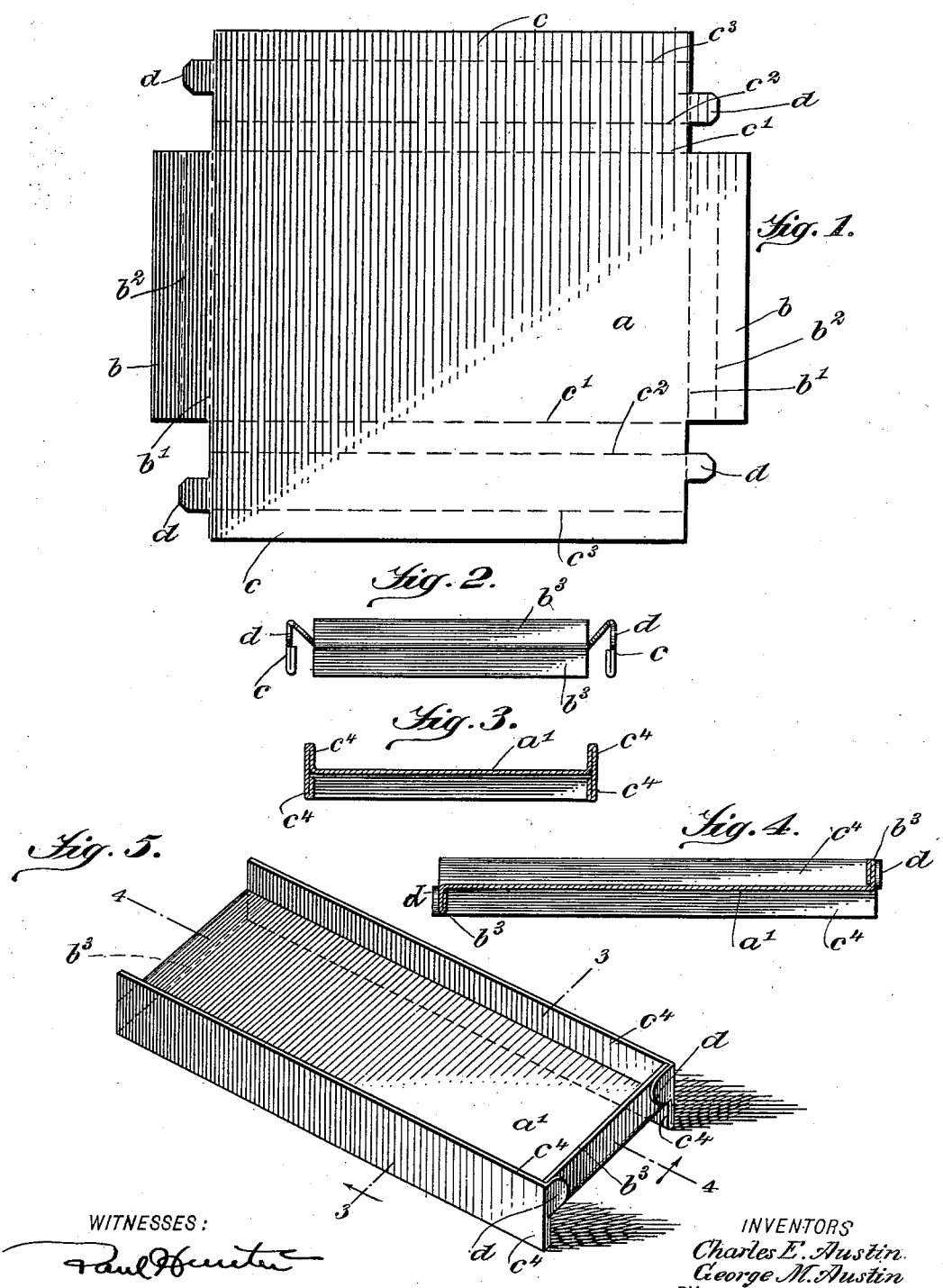
WITNESSES:
INVENTORS
Charles E. Austin
George M. Austin
BY
ATTORNEYS

UNITED STATES PATENT OFFICE.

CHARLES E. AUSTIN AND GEORGE M. AUSTIN, OF ROLLINSFORD, NEW HAMPSHIRE.

BAKE-PAN.

SPECIFICATION forming part of Letters Patent No. 711,813, dated October 21, 1902.

Application filed March 20, 1902. Serial No. 99,096. (No model.)

*To all whom it may concern:*

Be it known that we, CHARLES E. AUSTIN and GEORGE M. AUSTIN, citizens of the United States, and residents of Rollinsford, in the county of Strafford and State of New Hampshire, have invented a new and Improved Bake-Pan, of which the following is a full, clear, and exact description.

This invention relates to a pan designed especially for use in the baking trade for biscuits, cake, and like articles; and it comprises a certain novel structure preferably struck up from a single sheet of metal and having a bottom flanged at each side so as to make the pan reversible and also so as to leave a space beneath the bottom at all times, through which space the hot air may circulate freely.

This specification is an exact description of one example of our invention, while the claims define the actual scope thereof.

Reference is to be had to the accompanying drawings, forming a part of this specification, in which similar characters of reference indicate corresponding parts in all the views.

Figure 1 shows a blank partly cut, and the dotted lines of said view indicate the bends which are made in forming the complete pan. Fig. 2 is an end view of the pan in process of construction. Fig. 3 is a section on the line 3 3 of Fig. 5. Fig. 4 is a section on the line 4 4 of Fig. 5, and Fig. 5 is a perspective view of the finished article.

The main part $a$ of the blank in Fig. 1 forms the bottom of the pan, as indicated at $a'$ in Figs. 3, 4, and 5. The end flaps $b$ in Fig. 1 form the end flanges of the pan and are bent oppositely, first on the dotted lines $b'$ and thence inwardly on the dotted lines $b^2$, (see Fig. 1,) thus forming the oppositely-projected end walls, (indicated at $b^3$ in Figs. 4 and 5.) It will thus be seen that on each side of the bottom $a'$ there is a closed end $b^3$ and an open end, the open ends being placed at the respective ends of the pan.

The side walls of the pan are formed by the flaps $c$, Fig. 1. These flaps are first bent upward on the lines $c'$, thence downward on the lines $c^2$, and thence inward and upward on the lines $c^3$, all which lines are shown in Fig. 1 forming the double walls $c^4$ at each side of the bottom of the pan and extending along the entire length thereof. (See Figs. 2, 3, and 5.) On the flaps $c$ are formed tongues $d$, and when the flaps $b$ and $c$ have been properly bent the tongues are bent laterally past the ends of the pan and lie respectively against the outer sides of the end walls $b^3$. The completed pan thus assumes the form shown in Fig. 5. Fig. 2 shows the parts during the process of bending.

With respect to the completed pan it will be observed that the pan is reversible—that is to say, it may be turned on either side and used with equal facility. The pan has flanges or like members forming the walls of the pan and projecting from each face of the bottom. These walls sustain the bottom out of contact with the surface on which the pan rests. They are two in number, one above and one below the bottom of the pan, and each wall has an open portion. According to the specific structure here shown these open portions are at opposite ends of the pan, though this is not absolutely essential to the principle of my invention. This allows the cake or other food baked to be moved easily off of the pan, and it also allows the heat to circulate freely under the bottom of the pan during the baking operation.

Having thus described our invention, we claim as new and desire to secure by Letters Patent—

1. A bake-pan, comprising a bottom, and walls projected upward and downward from the edges thereof, forming a reversible pan, and holding the bottom of the pan continually out of contact with the surface on which the pan rests, said pan being formed of an integral sheet of metal struck up into the form specified.

2. A bake-pan formed of an integral sheet of metal, said sheet comprising a main part forming the bottom of the pan, and end and side flanges, the end flanges being bent oppositely to form end walls projecting from opposite faces of the bottom of the pan, and the side flaps being bent upon themselves and extended past both faces of the bottom to form side walls projecting from each face of the bottom.

3. A bake-pan formed of an integral sheet of metal, said sheet comprising a main part forming the bottom of the pan, and end and side flanges, the end flanges being bent oppositely to form end walls projecting from opposite faces of the bottom of the pan, and the side flaps being bent upon themselves and extended past both faces of the bottom to form side walls projecting from each face of the bottom, and fastening-tabs formed on certain of said flaps and bent into engagement with the other flaps when the pan is formed, whereby to hold the walls firmly connected.

4. A reversible bake-pan, having a main portion or bottom, and flanges forming the walls of the pan, said flanges projecting from each face of the bottom or main portion and sustaining the bottom out of contact with the surface on which the pan rests, each wall having an open portion therein, for the purpose specified.

5. A reversible bake-pan, having a main portion or bottom, and flanges forming the walls of the pan, said flanges projecting from each face of the bottom or main portion and sustaining the bottom out of contact with the surface on which the pan rests, each wall having an open portion therein, for the purpose specified, said open portions being located at opposite ends of the pan.

In testimony whereof we have signed our names to this specification in the presence of two subscribing witnesses.

CHARLES E. AUSTIN.
GEORGE M. AUSTIN.

Witnesses:
E. A. STEVENS,
LILLA E. WENTWORTH.